W. L. Colburn.
Steam Cut-Off.
No. 2,327. Reissued Aug. 7, 1866.
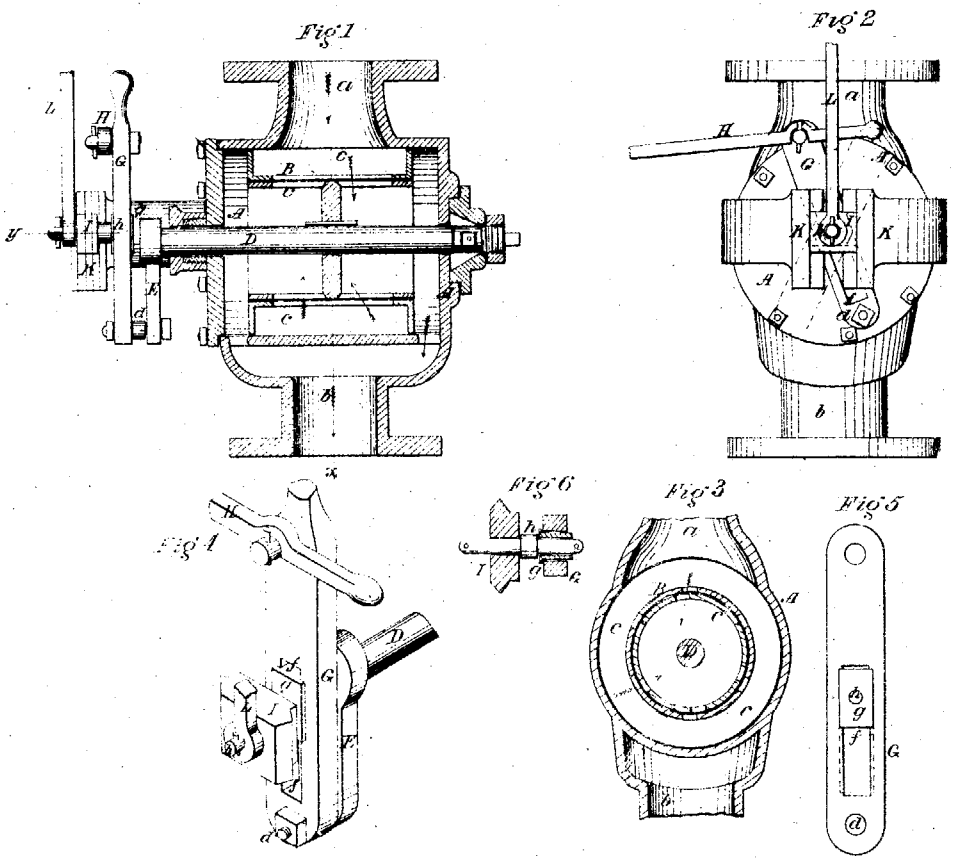
Witnesses:
Henry Cushing
Amos Cole
Inventor
W. L. Colburn

UNITED STATES PATENT OFFICE.

ALBERT D. CROMBIE AND LUCY COLBORN, OF BALTIMORE, MARYLAND, AND JOHN M. D. GREENE, OF FUNKVILLE, PENNSYLVANIA, ASSIGNEES, BY MESNE ASSIGNMENTS, OF WELLS L. COLBORN.

IMPROVEMENT IN CUT-OFF GEAR FOR STEAM-ENGINES.

Specification forming part of Letters Patent No. 41,810, dated March 1, 1864; Reissue No. 2,327, dated August 7, 1866.

DIVISION A.

*To all whom it may concern:*

Be it known that WELLS L. COLBORN, of Elmira, in the county of Chemung and State of New York, has invented a new and useful Improvement in Variable Apparatus for Operating Cut-Off Valves of Steam-Engines; and we do hereby declare that the following is a full and exact description thereof, reference being had to the accompanying drawings, making part of this specification.

Figure 1 is a central longitudinal vertical section of the improved device, the parts for operating the valve being shown in elevation; Fig. 2, an end elevation thereof; Fig. 3, a transverse vertical section of the valve and case in the plane of line *x x*, Fig. 1; Fig. 4, a perspective view of the operating parts detached; Fig. 5, an elevation of the rock lever and slide that operate the valve; Fig. 6, a transverse horizontal section of the operating parts in plane of line *y y*, Fig. 1.

Like letters of reference indicate corresponding parts in all the figures.

The object of this invention is to regulate the flow of steam from the steam-pipe to the steam-chest, so as to equalize the action whether the pressure be greater or less.

As represented in the drawings, A is a valve-case whose induction-opening *a* receives the steam from the steam-pipe, and whose eduction-outlet *b* discharges it into the steam-chest, whence it passes to the piston-cylinder through the ordinary slide-valves. In this case A are situated two cylinders, B and C, which form the valve proper, the outer one being stationary and having a steam-chamber, *c*, around it, and the inner one turning with a shaft, D, and fitting closely within the outer. Both cylinders are provided with ports, through which the steam enters, six being represented in each in the drawings, and these are so relatively arranged that those of the inner cylinder pass those of the outer at each direct and reverse stroke, whether said stroke is long or short. The regulation of the flow of steam is accomplished not by length of stroke or extent of movement of the inner cylinder, but by the quickness or slowness of the stroke, whereby the ports are a less or greater time in passing each other. The shaft D extends through both ends of the case, being adjusted, if desired, at the near extremity by means of a screw-thread and nut, while with the opposite extremity is connected the variable apparatus by which the valve is operated. and in which my invention consists.

To the end of the shaft is rigidly secured a crank, E, of suitable length, having at its bottom a pivot-joint, *d*, which connects with a rock-lever, G, actuated by means of a rod, H, at the opposite end, that receives motion from the eccentric of the engine. This rock-lever is provided with a slot, *f*, or equivalent, of suitable length, in which adjusts, up and down, a fulcrum-slide, *g*, connected with and turning freely on a wrist, *h*, Fig. 6, connecting in a similar manner with a sliding block, I. This block I slides up and down in suitable heads or guides K K, at the proper position in front of the case, and is operated by means of a rod, L, which connects it, in any suitable manner, with the ordinary governor or regulator above.

The operation of the device is obvious from the description already given: As the governor-balls rise or fall the rod L, the sliding block I, and consequently the fulcrum-slide *g* rise or fall in a corresponding degree, as indicated by the red lines, Figs. 2 and 5. The slide *g* forms the fulcrum on which the rock-lever G turns; and, as the upper and lower arms are lengthened or shortened, it is apparent the motion of the shaft D and valve-cylinder C are correspondingly retarded or accelerated. Thus when the upper arm of the lever, or that above the fulcrum *g*, is the shortest, (by reason of the rising of the fulcrum in the slot *f*,) the motion of the cylinder C is the greatest produced by the same length of stroke, and consequently the passage of the ports pass each other the quickest, so as to allow a shorter time for the passage of the steam; but when the lower arm of the lever is the shortest (by reason of the fall of the fulcrum) the motion of the cylinder is the slowest, so as to give the greater time for the passage of the steam.

This arrangement is very simple, and not liable to get out of order, and is very effective in accomplishing the object for which it is designed. The valve is nearly balanced by the pressure of the steam all around it, and therefore but very little force is necessary in operating it. By regulating the flow of the steam by a variation in the motion of the valve, instead of by opening a greater or less space of the ports simply, the action is much more regular, there is less jar and strain to the machinery, and a great saving in the expense of running an engine.

We do not intend to limit ourselves to the combination with the particular kind of valve shown in the drawings, as it is evident that it is applicable to many kinds of valves used for this purpose.

What we claim as the invention, and desire to secure by Letters Patent, is—

The combination of the sliding block I, the fulcrum *g*, and the rock-lever G, or their equivalents.

A. D. CROMBIE,
J. M. D. GREENE,
LUCY COLBORN,
*Assignees.*

Witnesses to signature of A. D. Crombie:
G. LOCKWOOD,
JNO. R. ERGOOD.
Witnesses to signature of J. M. D. Greene:
P. T. WITHEROY,
J. P. VARIAN.
Witnesses to signature of Lucy Colborn:
G. REILLEY,
THOS. B. SHARP.